J. Barnes, No Printed Specification Available
6189X
Washing Machine,
Patented Oct. 14, 1830.
Fig; 1.
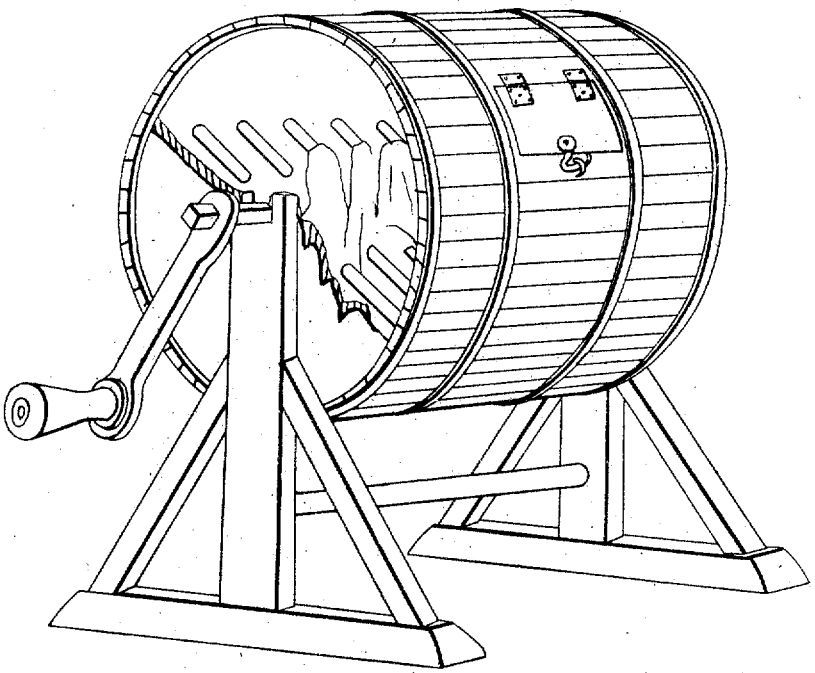
Fig; 2.
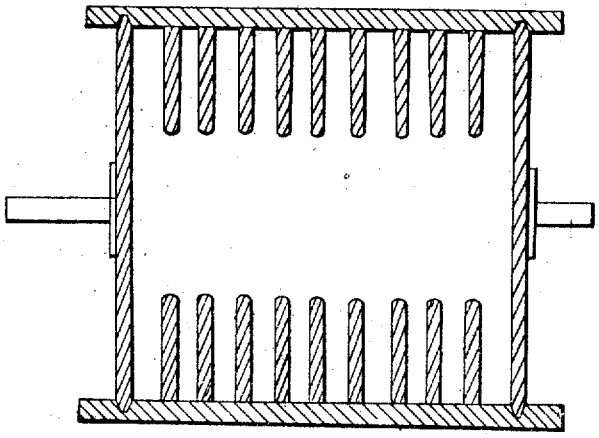

X6189 Oct. 14. 1830

James Barnes
Letters Patent.

The Schedule referred to in these Letters Patent and making part of the same containing a description in the words of the said James Barnes himself of his improvement in washing denominated "The revolving Steam Washer for steaming and cleaning all kinds of Clothes.

The said Machine consists of a cylinder 2 feet long and 2 feet in diameter, made of staves of any suitable kind of wood hooped securely with iron or other substantial material. An opening is made on one side of the cylinder of a size sufficient to admit the clothes and water freely. Said opening is to be covered closely by a door or lid & exactly fitted so that the steam and water in the machine cannot escape Thro' the sides of the cylinder at equal distances are inserted two or more rows of wooden pins turned smooth of the diameter of one inch extending lengthwise of the machine: and projecting inwardly about 6 inches from the inner surface of the same. the use of said pins is to raise the clothes in every revolution of the machine nearly to the top when they slide off into the water and allow the steam to pass through them. The said Cylinder is suspended upon a frame or otherwise by gud-geons attached to the centre of the heads. to one of these may be affixed a crank by means of which the machine may be operated by turning moderately. It may be so geared that two or more revolutions of the crank will cause one of the machine which will thereby diminish much of the labour in washing. The clothes to be washed should be put into the machine the first time with warm water sufficient to cover them and as much soap as shall be found useful. and the machine in ordinary cases should be operated about 4 or 5 minutes. when they may be wrung out and pass through a second operation in hot water which I believe in general will be found to supersede the necessity of boiling. they may then be rinsed either in the machine or in a tub in the ordinary way. The said machine may be varied in size and shape to suit circumstan-ces. May be made square oblong or round. Steam may be generated by swinging when suspended from any fixed object or by a round or square Vatt being placed upon rockers and with weights between to regulate the motion. The work may be effectually done by the united force of steam and water applied in any of these ways. the most convenient however and effectual in my opinion to pro-duce the desired result is the cylinder above described. In witness that the foregoing is a true Specification of the improvement for which I ask a Patent I have hereunto set my hand and seal this 10th day of August in the Year of our Lord One thousand Eight Hundred and thirty.

Witnesses { Thomas Dyer
Dinah Smith

James Barnes.

Exd
[illegible]

540 [illegible]

Drawing